C. WAINWRIGHT.
COMBINED VACUUM BREAKER AND PROPORTIONAL UNLOADER.
APPLICATION FILED AUG. 15, 1911.

1,081,174.

Patented Dec. 9, 1913.
7 SHEETS—SHEET 1.

C. WAINWRIGHT.
COMBINED VACUUM BREAKER AND PROPORTIONAL UNLOADER.
APPLICATION FILED AUG. 15, 1911.

1,081,174.

Patented Dec. 9, 1913.
7 SHEETS—SHEET 3.

WITNESSES:

INVENTOR.

ATTORNEY.

C. WAINWRIGHT.
COMBINED VACUUM BREAKER AND PROPORTIONAL UNLOADER.
APPLICATION FILED AUG. 15, 1911.

1,081,174.

Patented Dec. 9, 1913.
7 SHEETS—SHEET 5.

C. WAINWRIGHT.
COMBINED VACUUM BREAKER AND PROPORTIONAL UNLOADER.
APPLICATION FILED AUG. 15, 1911.

1,081,174.

Patented Dec. 9, 1913.
7 SHEETS—SHEET 6.

C. WAINWRIGHT.
COMBINED VACUUM BREAKER AND PROPORTIONAL UNLOADER.
APPLICATION FILED AUG. 15, 1911.

1,081,174.

Patented Dec. 9, 1913.
7 SHEETS—SHEET 7.

WITNESSES:

INVENTOR.
Charles Wainwright
BY
Victor J. Evans ATTORNEY.

UNITED STATES PATENT OFFICE.

CHARLES WAINWRIGHT, OF ERIE, PENNSYLVANIA.

COMBINED VACUUM-BREAKER AND PROPORTIONAL UNLOADER.

1,081,174.

Specification of Letters Patent. Patented Dec. 9, 1913.

Application filed August 15, 1911. Serial No. 644,111.

*To all whom it may concern:*

Be it known that I, CHARLES WAINWRIGHT, a citizen of the United States, residing at Erie, in the county of Erie and State of Pennsylvania, have invented new and useful Improvements in Combined Vacuum-Breakers and Proportional Unloaders, of which the following is a specification.

This invention relates to air and gas compressors and has for its primary object to reduce or practically eliminate the vacuum generated in the intercooler of compound compressors for gas or air; to devise a system of proportional unloading by stages of the machine, to vary automatically as the work required by the said machine, and to make starting of the machine, especially electric driven machines, much easier.

The invention is intended to prolong the life of machines of the character mentioned, particularly the discharge valves; to render them more quiet when the compressor is unloaded by destroying the vacuum in the intercooler, and also to provide for proportionally unloading by stages in connection with mechanically operated inlet valves, or other style of inlet valves.

The invention consists of the novel features, details of construction and combination of parts, which hereinafter will be more particularly set forth, illustrated in the accompanying drawings, and pointed out in the appended claims.

Referring to the drawings, forming a part of the specification.

Corresponding and like parts are referred to in the following description, and indicated in all the views of the drawings, by the same reference characters.

Figure 1:
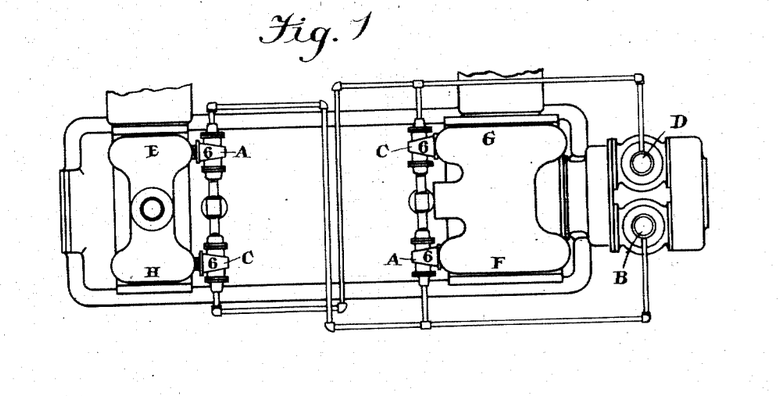
Figure 1 is a plan view of an air compressor showing high and low pressure cylinders in connection with an intercooler, together with means for breaking vacuum and the proportional unloading of machines by stages.

The vacuum breakers are indicated at A and C in Fig. 1 both for the high and the low pressure cylinders and the unloaders at B and D. Each of the vacuum breakers comprises a cylinder 6 having an opening 7 and an annular port 8 extending about the cylinder 6 and into the port of same.

Figures 7, 8:
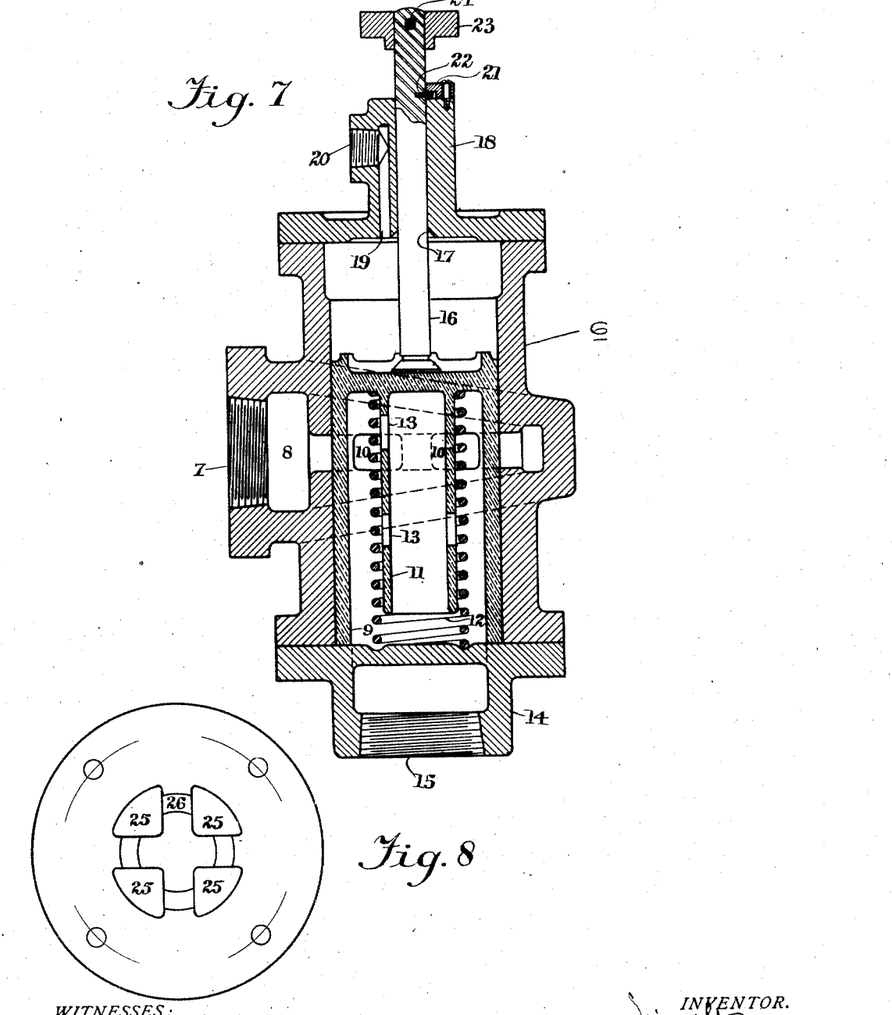
Fig. 7 is a sectional view of vacuum breaker.
Fig. 8 is plan view of end piece of vacuum breaker.

9 is a hollow piston with a suitable number of ports 10.

11 is a guide for spring 12. This guide also has openings 13 which allow the air or gas to pass within same, thus adding to the effective area for transmitting the same through said piston.

14 is an end piece which holds spring 12 in position and forms a stop for piston 9 and also forms an outlet 15.

16 is an auxiliary stem by which the piston 9 can be forced by hand to the stop 14 and 22 is a pin, which, as the knob 24 is turned to right or left, permits the pin 22 to engage with the recess in part 21, thus locking it in position. This permits a free course for air or gas through this device from 7 to 15. By releasing pin 22 the spring 12 forces piston 9 to its other extreme travel. Now should air pressure enter point 20, passing through canal 19 it would first force stem 16 home to its seat 17, thus preventing leaking by said stem 16 and further it would force piston 9 again to its stop piece 14, and ports of said piston 9 and ports of cylinders 6 now being in alinement, air or gas would pass from point 7 to 15. Now Fig. 8 merely shows ports 25 through stop piece 14 and groove 26 to receive spring 12.

Figure 6:
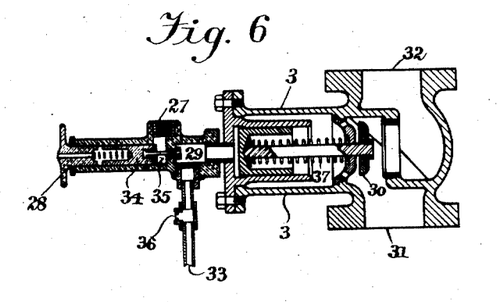
Fig. 6 is a vertical section through a choking controller.

A choking controller is interposed between the source of compressed air supply and the intake of the low pressure cylinder and may be of any known type, the form shown in detail in Fig. 6 is preferred and consists of two parts receiving coöperating valves 30 and 35. The compressed air from receiver tank or other convenient point enters point 27 at a predetermined point and governed by spring adjustment 28 air enters 29 and forces valve 30 to its seat thus stopping communication between points 31 and 32. Compressed air from chamber 29 also enters through suitable piping 33 the canal 19 (Fig. 7) and forces piston 9 to its seat, thus opening a way between points 7 and 15. Now as the pressure in air receiver tank falls to a predetermined point the piston 34 moved by its spring forces needle valve 35 to its seat and now as compressed air in piping 33 is relieved through a vent hole 36 the valve 30 moves away from its seat due to the tension of its spring 37 and the piston 9 in Fig. 7 moves to its upward stop due to its spring 12.

Figure 5:
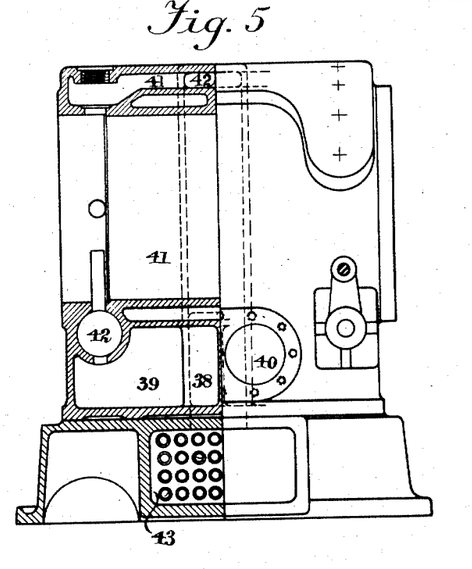
Fig. 5 a part vertical sectional view through low pressure cylinder and intercooler, the other part being an end elevation of low pressure cylinder and cooler box with unloading device 3, fittings 4 and 5, and piston and inlet valve of air cylinder omitted.

As shown most clearly in Fig. 5 the intake compartment of the cylinder is divided into three compartments, the compartment 38 takes the compressed air or gas from compartment 41 conducted by passway 42 to intercooler. Compartments 39 and 40 lead to the cylinder bore 41 through valve bore 42, one being in each end of cylinder, the valve in valve bore 42 is not shown.

Figure 4:
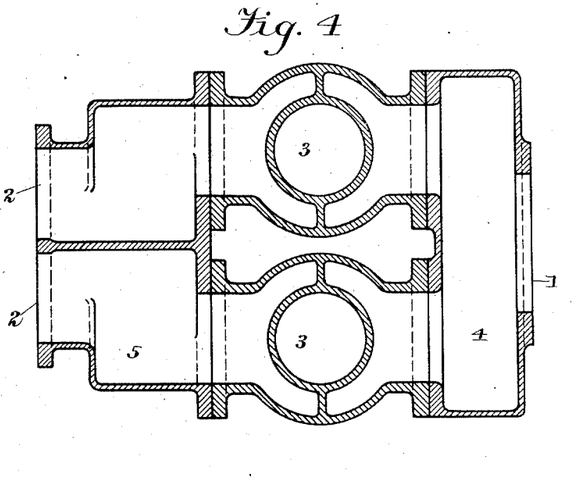
Fig. 4 is an enlarged horizontal sectional view from intake flange 1 to the side flange 2 of low pressure cylinder on the line $x$—$x$ of Fig. 2.

Fig. 4 shows in detail the special connections 4 and 5 used to couple unloader 3 from the common intake 1 of part 4 to the openings 2 which lead to the compartments 39 and 40 of the low pressure cylinder.

Figure 2:
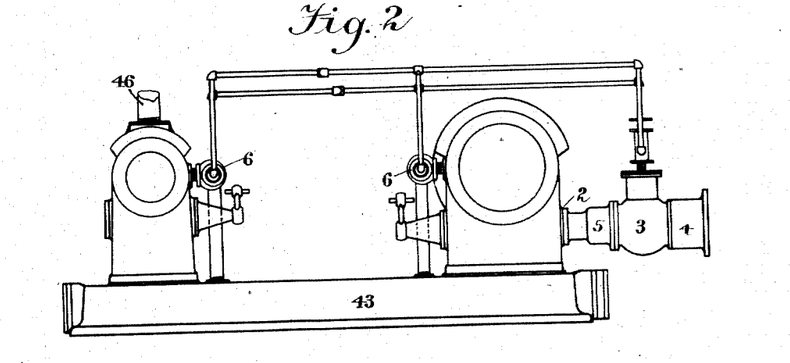
Fig. 2 is a side elevation.
Figure 3:
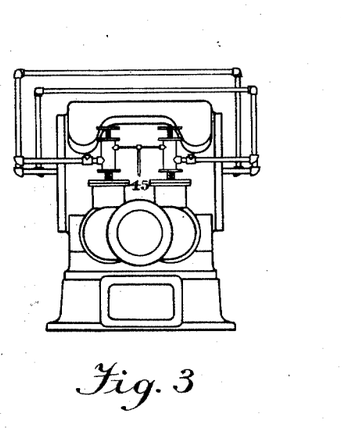
Fig. 3 is an end elevation.

Figs. 1 and 2 show Fig. 7 connected to the cylinders and also unloaders 3 shown in Fig. 6 connected to low pressure cylinder by fixtures 4 and 5 shown in Fig. 4. Fig. 1 also shows that two vacuum breakers designated by A are connected to one choking controller designated by B and that two other vacuum breakers designated by C are connected to one choking controller D by suitable piping. Fig. 3 shows further that point 27 of Fig. 6 of each unloader is piped to a common point 45 which leads to a receiver or discharge piping 46 of H. P. cylinder shown in Fig. 2.

In starting a compressor, electrically or belt or turbine driven, etc., the knob 24 is pushed down and locked into position (see Fig. 7). This is done upon all four vacuum breakers designated by 6 in Fig. 1. The effect of this is that the discharge valves of both low and high pressure cylinders become inoperative and this prevents the compression of air in both high and low pressure cylinders, and thus permits the compressor to easily get up to required speed, then the stem 16 is released (see Fig. 7) on all vacuum breakers previously mentioned, the machine is then ready for the compression of air or gas as the case may be. Now as the predetermined air or gas pressure of compressor is reached, one of the choking controllers, namely B, goes into operation, thus stopping flow of air through same to that side of low pressure cylinder, now at the same time or just a little before the two vacuum breakers A (see Fig. 1) having also gone into operation, prevents the compression of air in the ends E and F of high and low pressure cylinder respectively, and furthermore eliminates the possibility of vacuum being formed in the intercooler chamber 43. Now should the terminal pressure of the machine still increase due to any reason, then the unloader D goes into action and similarly like the other side, the vacuum circuit breakers C go into action with results as already mentioned. Thus it is seen that unloader B and the two vacuum breakers A work together and likewise unloader D and the two vacuum breakers C. The result of this combination is this, that the scheme makes possible a combination whereby the vacuum generated in compound compressors is practically eliminated and furthermore it permits of a proportional unloading by stages of compressors to meet automatically the demand as used.

Novelty is claimed for the system of unloading in connection with a form of intake choking controller in combination with vacuum circuit breakers which destroy or practically eliminate the vacuum generated in compound machines which occurs when merely a form of choking controller is used on the intake to low pressure cylinder. By this system the unloading takes place by stages instead of being all off or all on and further also that this system of unloading is automatically proportional to the volume of air required from machine provided, of course that said volume is within the limits of machine.

It is observed that the vacuum breakers being equipped with stops which when set, that said vacuum breakers serve as relief valves and thereby make the discharge valves of both high and low pressure cylinders inoperative, with the result that a compressor driven by any form of motor can thus be easily started and when compressor is up to speed that by relieving stops, said machine is ready for compression. It will thus be noted that this system adds to length of life of compressor by relief given to discharge valve when machine is unloaded.

Figure 9:
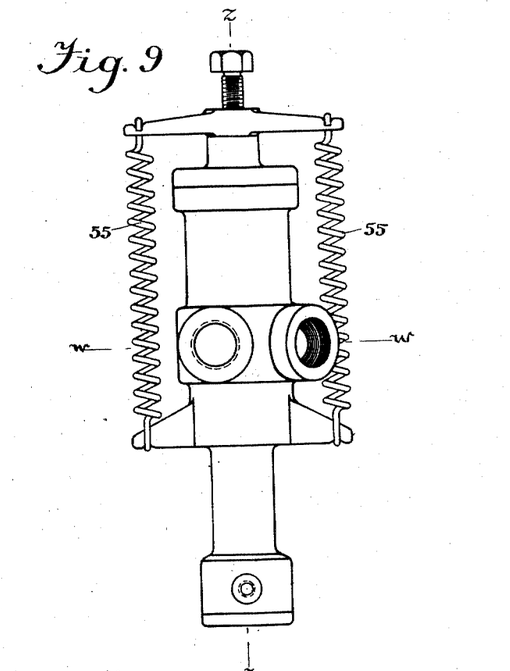
Fig. 9 is a modified form of vacuum breaker.
Figure 10:
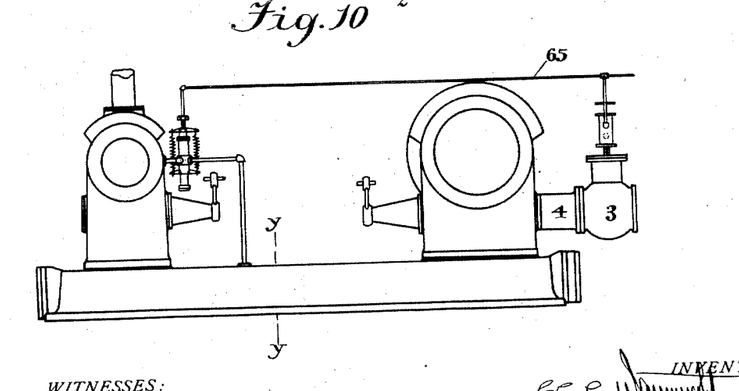
Fig. 10 is a view similar to Fig. 2, showing the vacuum breaker replaced by the vacuum breaker illustrated in Fig. 9.
Figure 11:
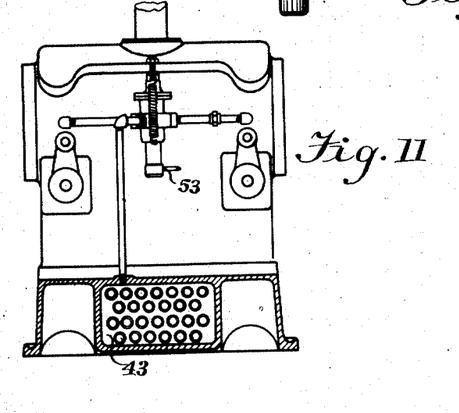
Fig. 11 is a section on the line $y$—$y$ of Fig. 10, looking to the left.
Figure 12:
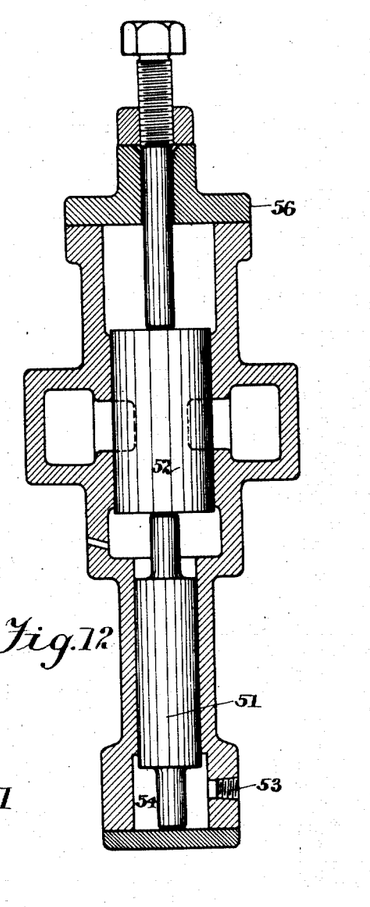
Fig. 12 is an enlarged section on the line $z$—$z$ of Fig. 9.
Figure 13:
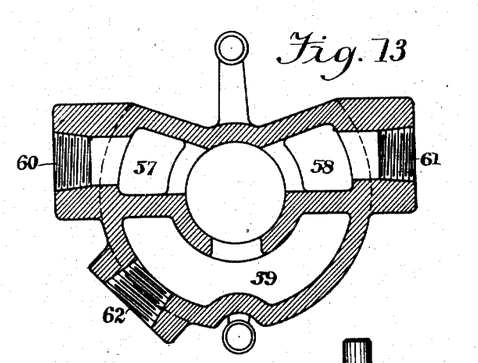
Fig. 13 is a horizontal section on the line $w$—$w$ of Fig. 9.
Figure 14:
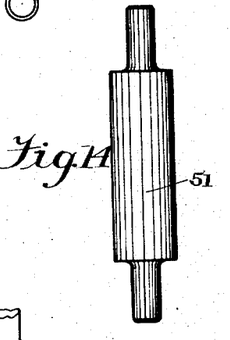
Fig. 14 is an elevation of the lower piston used in the modified form of vacuum breaker.
Figure 15:
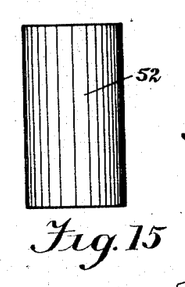
Fig. 15 is a detail view of the upper piston employed in the vacuum breaker shown in Fig. 9.

It is realized that where the proportional unloading by stages is not desired and where a single choking controller is used on intake to low pressure cylinder of compound machines that the vacuum generated in intercooler between the two cylinders would still be undesirable, hence a simpler scheme has been devised for doing this as shown in Figs. 9, 10, 11, 12, 13, 14 and 15. Fig. 10 shows a choking controller 3, Fig. 6, connected by a fitting 4 as shown in Fig. 4 to the intake of the low pressure cylinder. Fig. 9 shows a side elevation of assembled vacuum breaker as shown in detail in Figs. 12, 13, 14 and 15. Fig. 12 is a sectional view of Fig. 9 and Fig. 13 is a horizontal sectional view of Fig. 9. Figs. 14 and 15 show pistons 51, which for convenience are made in two pieces. As air pressure is admitted to the chamber 54 the pistons 51 and 52 are moved upward against tension of springs 55 until piston 52 strikes stop 56 and thus brings chambers 57, 58 and 59 in communication with each other. As pressure is relieved in chamber 54 the springs 55 bring pistons 51 and 52 back to their other extreme position, thereby cutting off the communication between chambers 57, 58 and 59. The vacuum breaker, Fig. 9, is connected to air cylinder, as shown in Fig. 11. The points 60 and 61 (see Figs. 13 and 11) are connected to either end of cylinder and the point 62 to the intercooler chamber 43. The point 53 (Figs. 11 and 12) is connected in common by piping 65 with unloader 3, as shown in Fig. 10, which is connected to air pressure for compressor. About the same time that unloader 3 goes into operation the vacuum breaker shown in Fig. 9 goes into operation, thereby forming communication between each end of air cylinder also with intercooler 43. The result is that the vacuum that is generated when choking controller is used is done away with.

From the foregoing it will be understood that the elimination of the vacuum in compound machines does away with the noise of the discharge valves of both high and low pressure cylinders and furthermore, that by keeping valves quiet and from dancing upon their seat that same makes their life longer. These points are quite essential in high speed compressors.

From the foregoing description, taken in connection with the accompanying drawings, the advantages of the construction and of the method of operation will be readily apparent to those skilled in the art to which the invention appertains, and while I have described the principle of operation of the invention, together with the device which I now consider to be the embodiment thereof, I desire to have it understood that the device shown is merely illustrative, and that such changes may be made when desired as are within the scope of the claims appended hereto.

Figure 16:
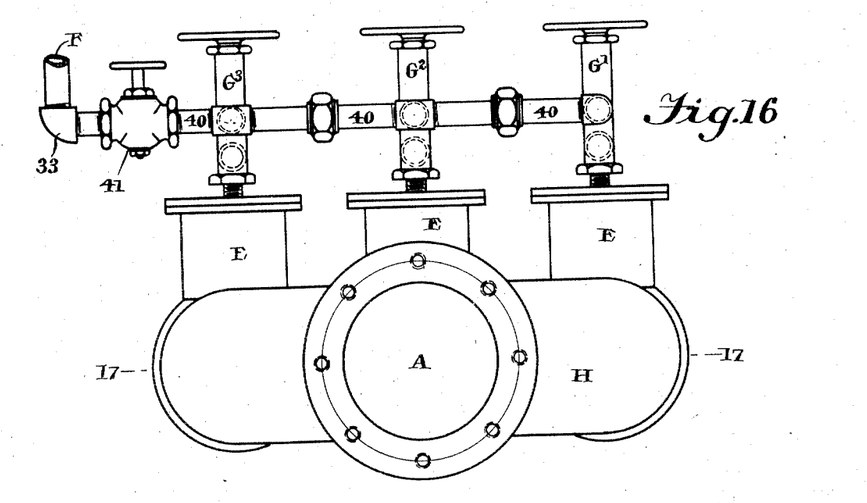
Fig. 16 is a side view of an appliance to be introduced between a compressor and a receiver for proportionately unloading the compressor by stages according to the work required.
Figure 17:
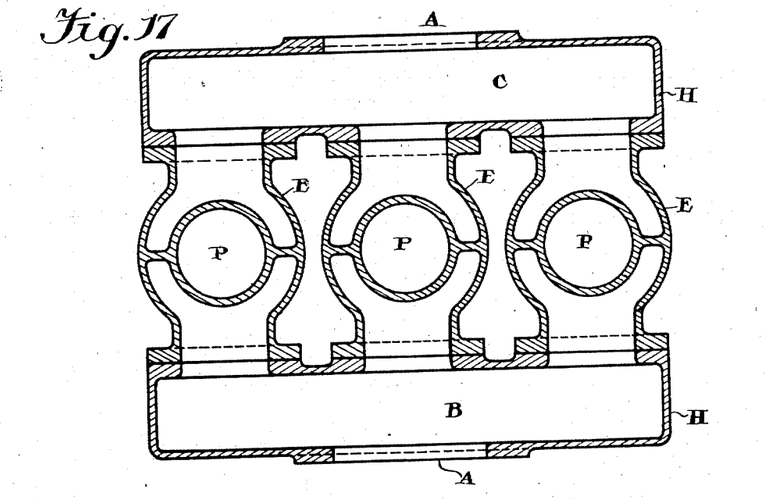
Fig. 17 is a horizontal section on the line 17—17 of Fig. 16.

In the arrangement shown in Figs. 16 and 17 two headers or fittings H are provided, each having an opening A and between these two fittings or headers are located a plurality of choking controllers E which may be of any type, but is preferably of the form shown more particularly in Fig. 6. The combined openings P of the unloaders E are made equal to the area of the inlet and discharge openings A. In the operation of the variable proportional unloader for the compressor the device has one of its openings A connected to the inlet of the compressor in any suitable way, the other opening A leading to the atmosphere. The auxiliary valves $G^x$ are connected by suitable piping 40, which may be provided with a globe valve 41 from which extends a pipe 33 which connects with the receiver. The globe valve 41 is used simply as a matter of convenience. In operation the valve $G'$ may be set to work between 100 and 96 pounds pressure and $G^2$ between 96 and 92 and $G^3$ between 92 and 88. When the air pressure within the receiver or the compressor reaches 92 pounds $G^3$ cuts out or closes. If the air pressure increases to 96 pounds $G^2$ cuts out or closes and if the pressure further rises to 100 $G'$ cuts out, thereby completely unloading the machine. When the pressure falls the reverse is true. It will thus be understood that the appliance admits of a compressor being loaded or unloaded through a given number of stages, hence a compressor may be arranged for example to unload at one-quarter, one-half or three-quarters of its entire volume or at any desired proportion of its volume as may be required.

Having thus described the invention what is claimed as new, is:—

1. In a fluid compressor, the combination with the pump mechanism, and an intercooler connected to the cylinder of the pump mechanism; of a fluid operated vacuum breaker connected to the cylinder and to the intercooler, a choking controller arranged to operate on the intake of the pump mechanism and adapted to be operated with a predetermined pressure in the receiver of the compressor and connected with the vacuum breaker whereby to control the operation of the same.

2. In a multiple-stage fluid compressor, the combination with the pump mechanism and an intercooler connected to the cylinders of the pump mechanism; of fluid operated vacuum breakers connected to the cylinders of the pump mechanism and to the intake, and a choking controller adapted to be operated with a predetermined pressure in the receiver of the compressor and arranged for operating on the intake of the pump mechanism and connected to the vacuum breakers for controlling the operation of the same.

3. In a double-acting fluid compressor, the combination with the pump mechanism, and an intercooler connected to the cylinder of the pump mechanism; of fluid operated vacuum breakers connected to the cylinder of the pump mechanism and to the intercooler, a plurality of choking controllers each adapted to be operated with a different predetermined pressure in the receiver of the compressor and positioned so as to control the intake of the pump mechanism, and a connection between said controllers and said vacuum breakers for the purpose described.

4. In a double-acting multiple stage fluid compressor, the combination with the pump mechanism, and an intercooler connected to the high and low pressure cylinders of the pump mechanism; of a plurality of fluid operated vacuum breakers connected to the high and low pressure cylinders and to the intercooler, a plurality of choking controllers arranged to operate on the intake of the low pressure cylinder and adapted to be operated with different predetermined pressures in the receiver of the compressor, and connections between said choking controllers and said vacuum breakers for the purpose described.

In testimony whereof I affix my signature in presence of two witnesses.

CHARLES WAINWRIGHT.

Witnesses:
FRED J. CARNEY,
JAMES N. ALLBURN.